United States Patent
Dienhart et al.

(10) Patent No.: US 12,551,833 B2
(45) Date of Patent: Feb. 17, 2026

(54) DEVICE FOR DETECTING A FILTER LOADING

(71) Applicant: Ford Global Technologies, LLC, Dearborn, MI (US)

(72) Inventors: Bernd Dienhart, Cologne (DE); Klaus Schuermanns, Cologne (DE); Volker Scheer, Roetgen (DE); Ingo Krolewski, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 18/078,371

(22) Filed: Dec. 9, 2022

(65) Prior Publication Data

US 2023/0191302 A1 Jun. 22, 2023

(30) Foreign Application Priority Data

Dec. 22, 2021 (DE) .......................... 102021134318.6

(51) Int. Cl.
*B01D 46/00* (2022.01)
*B01D 35/143* (2006.01)
*B60H 3/06* (2006.01)

(52) U.S. Cl.
CPC ....... *B01D 46/0086* (2013.01); *B01D 35/143* (2013.01); *B60H 3/0608* (2013.01)

(58) Field of Classification Search
CPC .............. B01D 46/0086; B01D 35/143; B01D 46/521; B01D 46/009; B60H 3/0608; B60H 3/0616; B60H 2003/0683; B60H 3/06; B60H 1/00585
See application file for complete search history.

(56) References Cited

U.S. PATENT DOCUMENTS

| | | | |
|---|---|---|---|
| 2011/0068053 A1 | 3/2011 | Kim et al. | |
| 2018/0229161 A1* | 8/2018 | Maki | B01D 35/143 |
| 2021/0129054 A1 | 5/2021 | Baker et al. | |

FOREIGN PATENT DOCUMENTS

| | | |
|---|---|---|
| DE | 3914664 A1 | 11/1990 |
| DE | 19831313 A1 | 1/2000 |
| WO | 2021152544 A1 | 8/2021 |

* cited by examiner

*Primary Examiner* — Terry K Cecil
(74) *Attorney, Agent, or Firm* — Vichit Chea; Price Heneveld LLP

(57) ABSTRACT

A filter device of an air-conditioning system of a motor vehicle is provided. The filter device has at least one indicator device arranged in the filter device, the indicator device having at least one electrically conductive indicator material, the conductive characteristics of which vary in a manner dependent on the degree of loading of the filter device with filtered particles. Also provided is a motor vehicle having an air-conditioning system comprising the filter device, and a method for detecting the state of the filter device.

19 Claims, 16 Drawing Sheets

DEVICE FOR DETECTING A FILTER LOADING

CROSS-REFERENCE TO RELATED APPLICATION

This application claims foreign priority benefits under 35 U.S.C. § 119(a)-(d) to German Patent Application No. 102021134318.6 filed on Dec. 22, 2021, which is hereby incorporated by reference in its entirety.

FIELD OF THE DISCLOSURE

The disclosure generally relates to a filter device having an indicating device for detecting the loading of the filter, a method for detecting the filter loading, and a motor vehicle having the filter device.

BACKGROUND OF THE DISCLOSURE

Air-conditioning systems in vehicles are generally provided for providing the air in the vehicle interior compartment in an intended temperature and humidity range. For this purpose, it is commonly the case that outside air, on its path into the vehicle interior region, is filtered, is mixed with interior air, and is cooled or warmed.

The servicing of air conditioning air filters is commonly performed within the scope of regular vehicle servicing, which normally may be provided every 20,000-30,000 km or every 1 to 2 years, for example. The aging of filters can however vary considerably, because vehicles are commonly used under very different environmental conditions, such as for example in urban areas, in rural areas, in mountainous areas, in coastal areas, in forest areas, in desert areas and the like. As a result, air drawn into the vehicle can be laden with different particles in different quantities (for example with dust, pollen, gases, etc.). The time that elapses before filter servicing is required can therefore greatly vary.

Heavy loading typically reduces the efficiency of the filter, because the air cannot flow through as freely. This can for example lead to fogging of the windshield and reduced performance during deicing of the windshield. Aside from the function of the air-conditioning system, the filter loading therefore may have a direct influence on driving. It would be desirable to monitor the present filter loading and to make the information relating to the filter loading available in a convenient form.

SUMMARY OF THE DISCLOSURE

According to a first aspect of the present disclosure, an arrangement of a filter device, configured for filtering particles out of an air stream of an air-conditioning system of a motor vehicle, the filter device comprising at least one indicator device arranged in the filter device, the indicator device having at least one electrically conductive indicator material, the conductive characteristics of which vary in a manner dependent on the degree of loading of the filter device with filtered particles.

According to a second aspect of the present disclosure, a motor vehicle is provided including an arrangement of a filter device, configured for filtering particles out of an air stream of an air-conditioning system of a motor vehicle, the filter device having at least one indicator device arranged in the filter device, the indicator device having at least one electrically conductive indicator material, the conductive characteristics of which vary in a manner dependent on the degree of loading of the filter device with filtered particles.

According to a third aspect of the present disclosure, a method for detecting a status of a loading of a filter device in an air-conditioning system of a motor vehicle, which has an arrangement of a filter device for filtering particles out of an airstream of an air-conditioning system of a motor vehicle is provided. The method includes the steps of starting an operation of the motor vehicle, measuring a resistance of an indicator device, comparing the measured resistance with a reference curve, evaluating a relative life expectancy of the filter device, and displaying at least one of the relative life expectancy of the filter device and an indication that the filter device must or should be exchanged.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
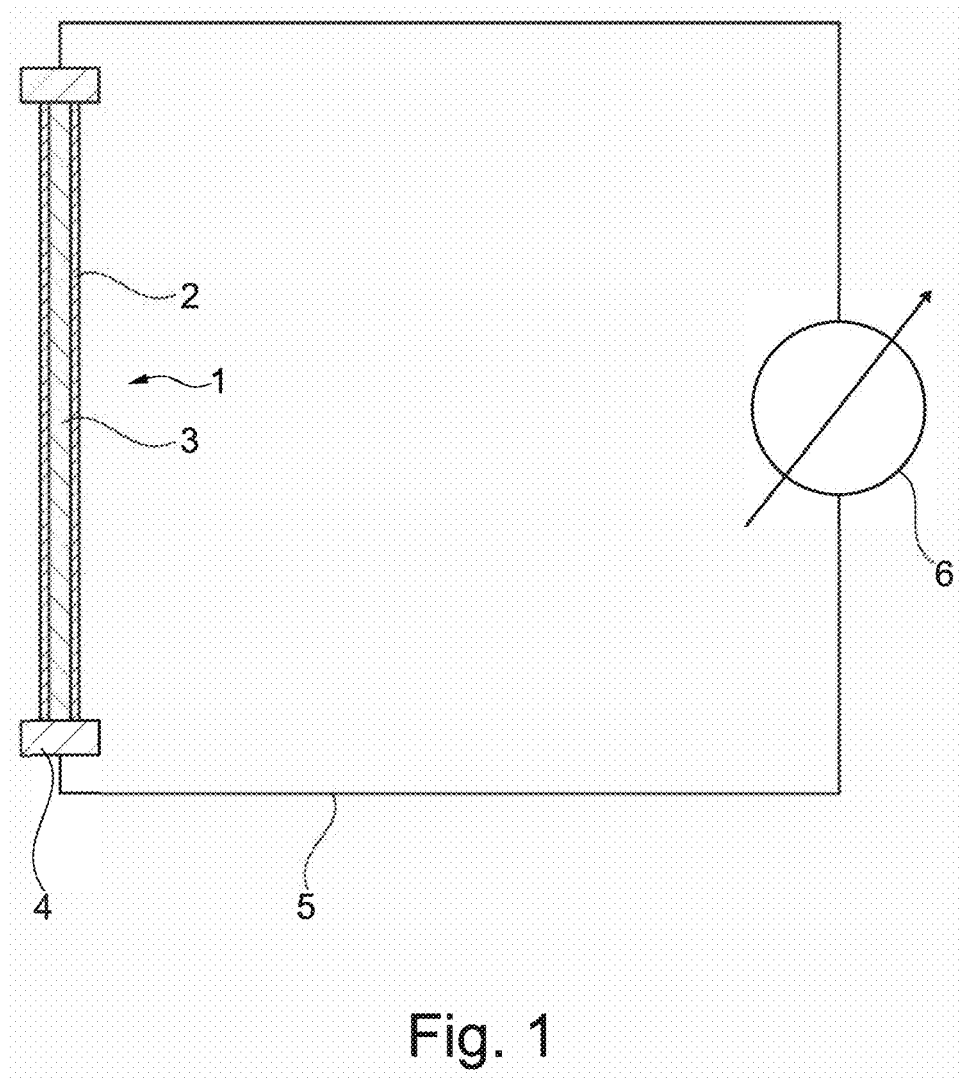
FIG. 1 is a schematic illustration of an indicator device and measuring device that may be provided on a filter device.

FIG. 1 illustrates an indicator device 1 connected to a measuring device 6 for use in a filter device in accordance with one embodiment. The indicator device 1 comprises an electrically conductive indicator material 2. The indicator material 2 may be carbon in the form of graphene, for example. It is alternatively possible for metals, metallic materials and other materials to be used as indicator material 2, as stated in table 1.

The indicator material 2 is mounted around a carrier material 3. In one example, the carrier material 3 is paper. It is also possible for wood, cotton, silk, hairs or polymers to be used as the carrier material 3. The carrier material 3 may also be composed of a polymer material. Furthermore, the indicator material 2 also need not imperatively be mounted on or around a carrier material, and embodiments therefore exist which may have no carrier material.

The indicator device is connected via connections 4 and cables 5 to the measuring device 6 that displays the electrical resistance. The electrical resistance of the electrical conductivity of the indicator material 2 is used, which is displayed by way of a signal device, connected to the measuring device 6, in the vehicle.

Figure 2:
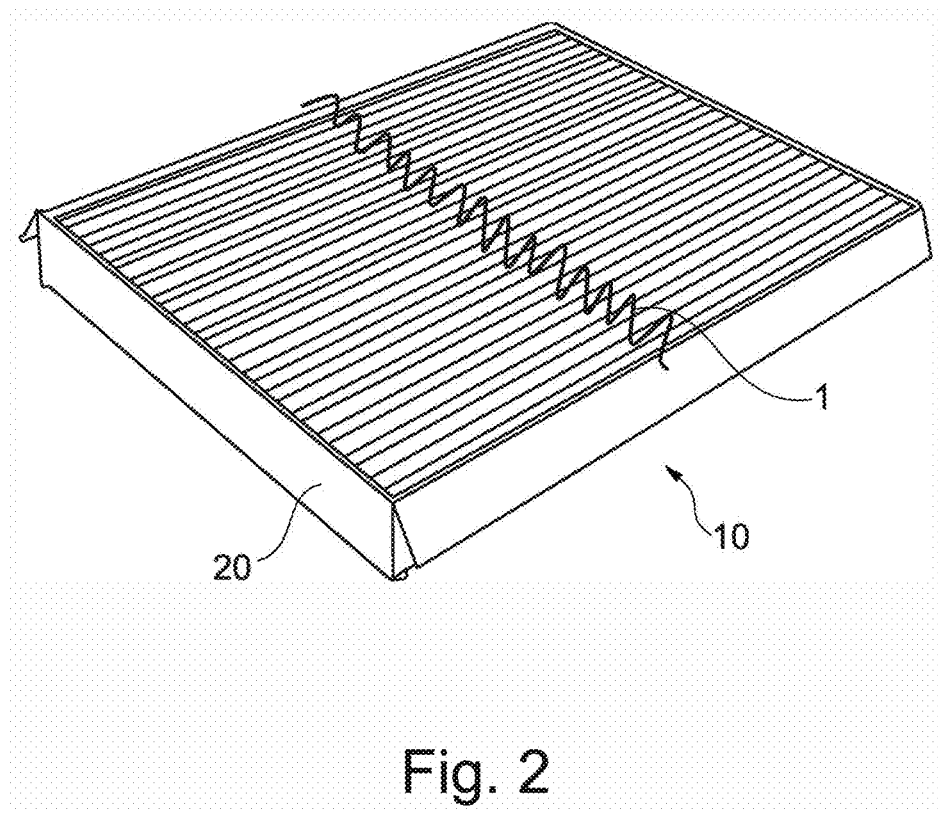
FIG. 2 is a schematic illustration of an embodiment of the arrangement of the filter device having the indicator device.

FIG. 2 illustrates an embodiment of an arrangement 10 of a filter device 20 configured for filtering particles. The arrangement 10 has the filter device 20, into the material of which the indicator device 1 is integrated.

Figure 3:
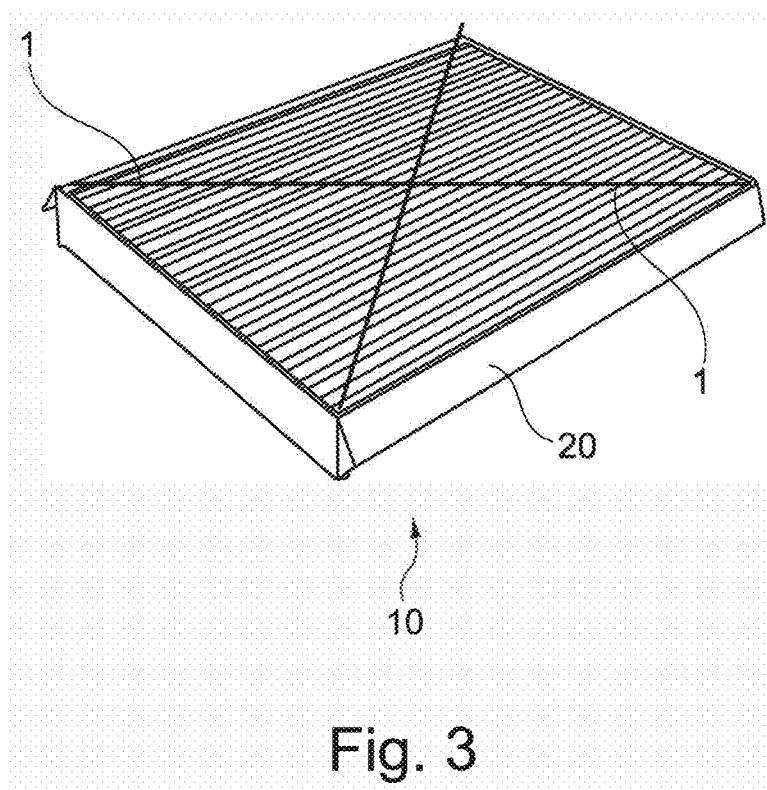
FIG. 3 is a schematic illustration of a further embodiment of the arrangement of the filter device.

FIG. 3 illustrates a further embodiment of the arrangement 10. The arrangement 10 has a filter device 20, wherein the indicator device 1 is in this case arranged in the region of the surface of the top side (or front side) of the filter device 20. Alternatively, or in addition, the indicator device 1 may also be arranged in the region of the surface of the bottom side (or rear side) of the filter device 20.

Figure 4:
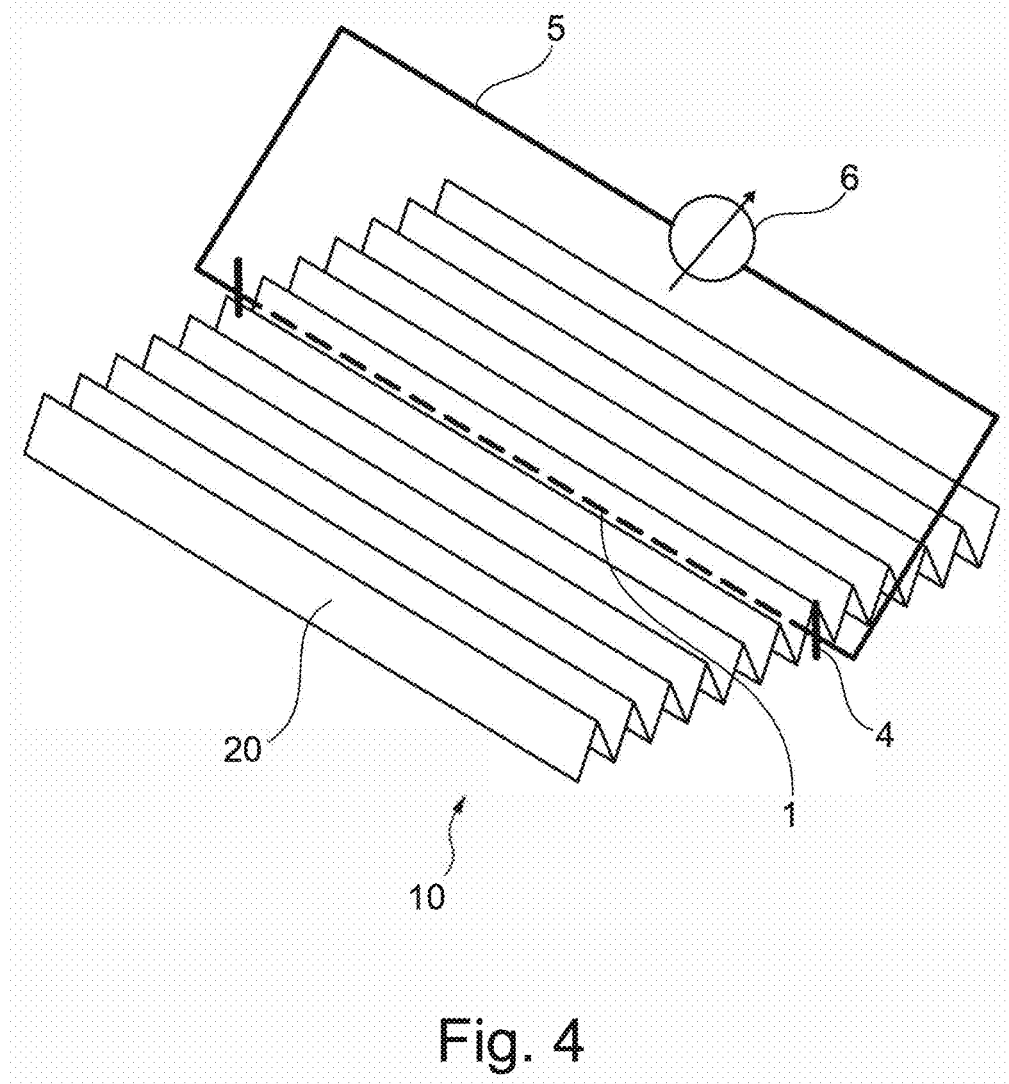
FIG. 4 is a schematic illustration of a further embodiment of the arrangement of the filter device.

FIG. 4 illustrates an arrangement 10 of a filter device 20 according to one embodiment. Here, the indicator device 1 with the electrical circuit of FIG. 1 is arranged in the filter device 20 of an air-conditioning system of a motor vehicle. The filter device 20 in this example has a pleated filter medium which may be composed of a synthetic melt-blown nonwoven (which, owing to its electrostatic characteristics, can filter dust out of the air). A layer composed of activated carbon may be integrated in the filter medium (for the purposes of filtering gases and odors). It is conceivable that a person skilled in the art may select other materials.

Figure 5:
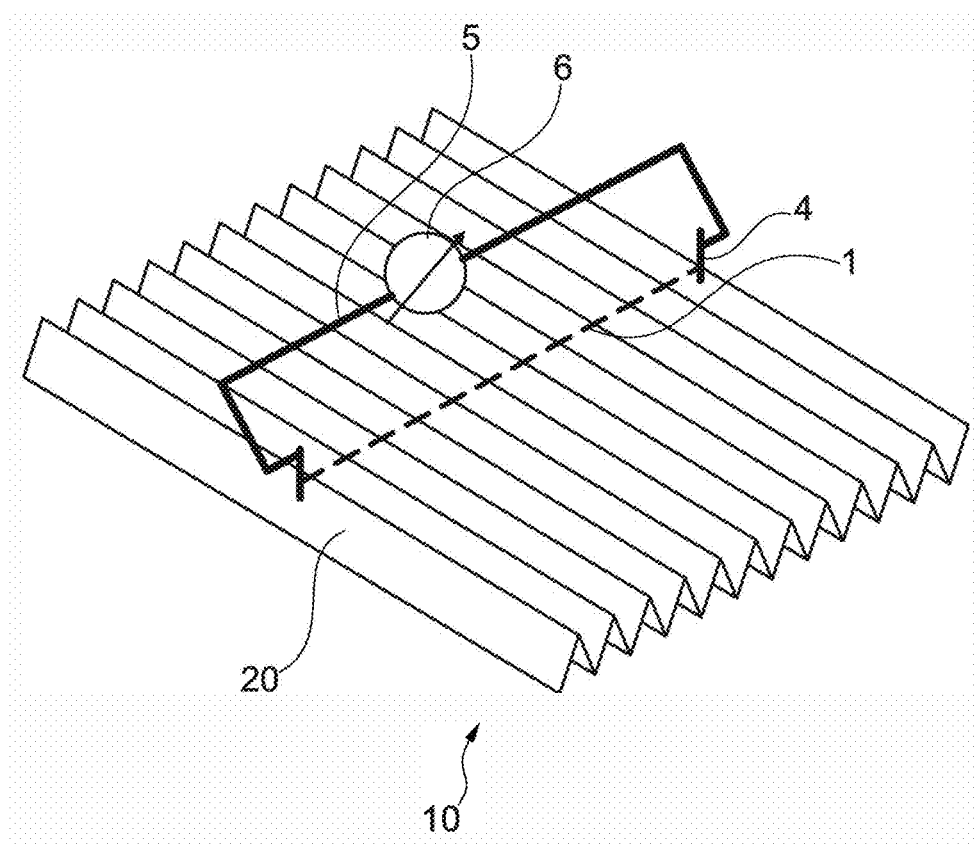
FIG. 5 is a schematic illustration of a further embodiment of the arrangement of the filter device.

In FIG. 4, the indicator device 1 is arranged in a pleat of the filter device 20. An alternative possible arrangement is shown in FIG. 5, in which the indicator device 1 is mounted on the filter medium transversely with respect to the pleats.

Figure 6:
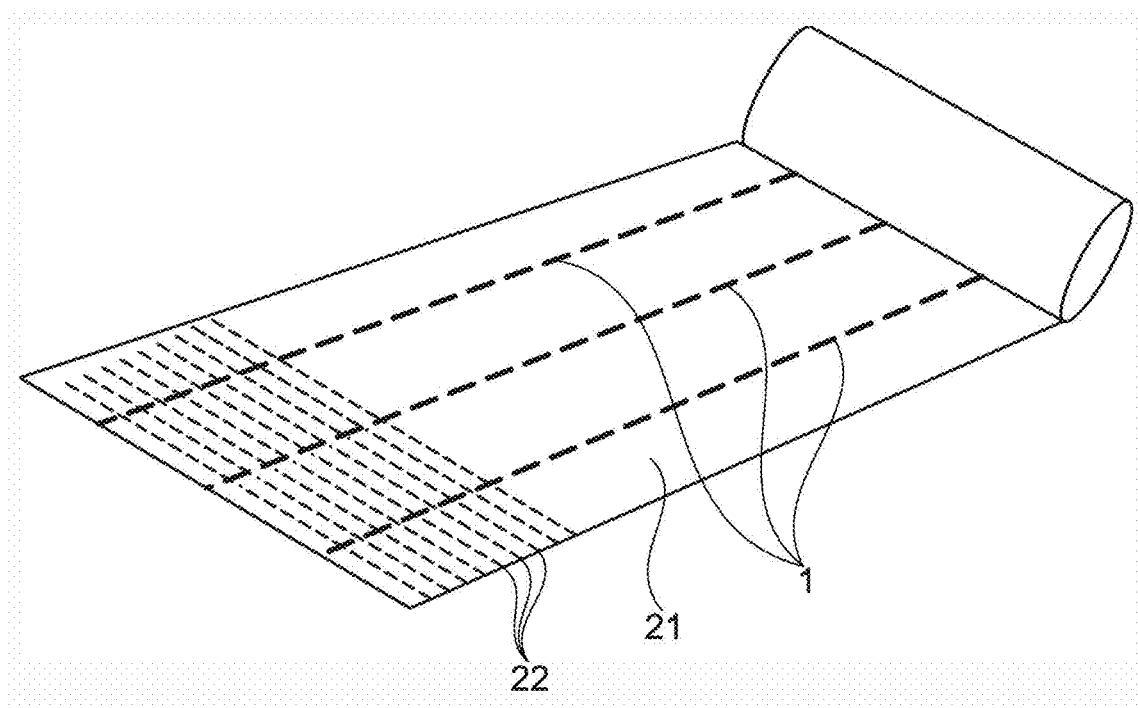
FIG. 6 is a schematic illustration of a further embodiment of the arrangement of the filter device.

FIG. 6 illustrates how the indicator device 1 can be arranged in the filter medium 21 transversely with respect to the pleats. Here, the filter medium 21 is in its situation prior to the pleating process, configured with pleat lines 22 already indicated. The filter medium 21 is present in unrolled form. Three indicator devices 1 are shown, which are arranged in the region of the surface of the filter medium 21 prior to the pleating of the filter medium 21, for example by virtue of a metal wire being sewn into, or graphite lines being printed onto the surface. The material of the filter medium 21 may serve directly as carrier material 3.

Figure 7:
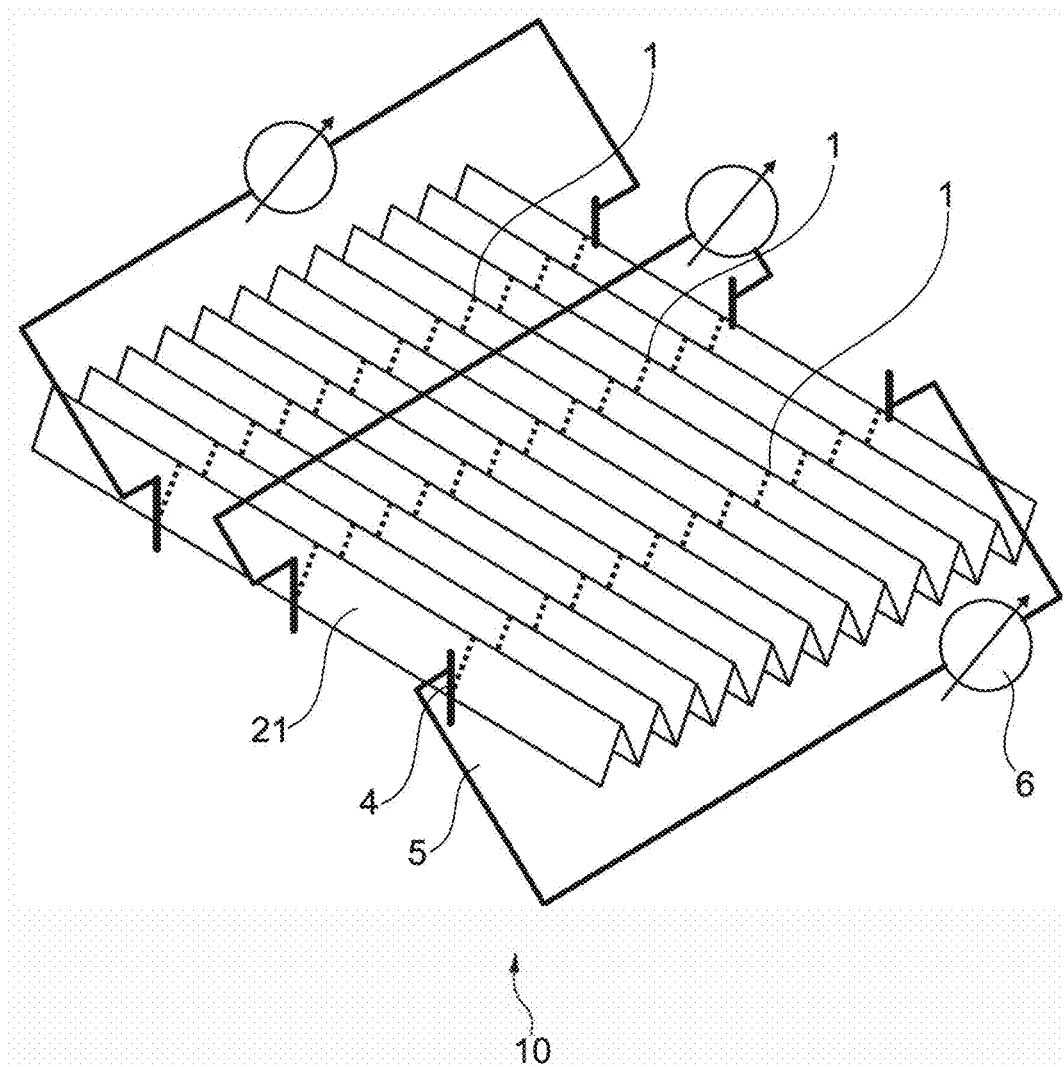
FIG. 7 is a schematic illustration of a further embodiment of the arrangement of the filter device.

FIG. 7 shows the arrangement of FIG. 6, with the filter medium 21 having been pleated. One feature in FIG. 7 is that each indicator device 1 is connected to a dedicated measuring device 6 (individual configuration). Here, each indicator device 1 may have a different indicator material 2, which is configured for detecting in each case a different substance contained in the air for filtering. The arrangement of FIG. 7 thus advantageously makes it possible for different substances to be detected, and for multiple regions of the filter device 20 to be observed.

Figure 8:
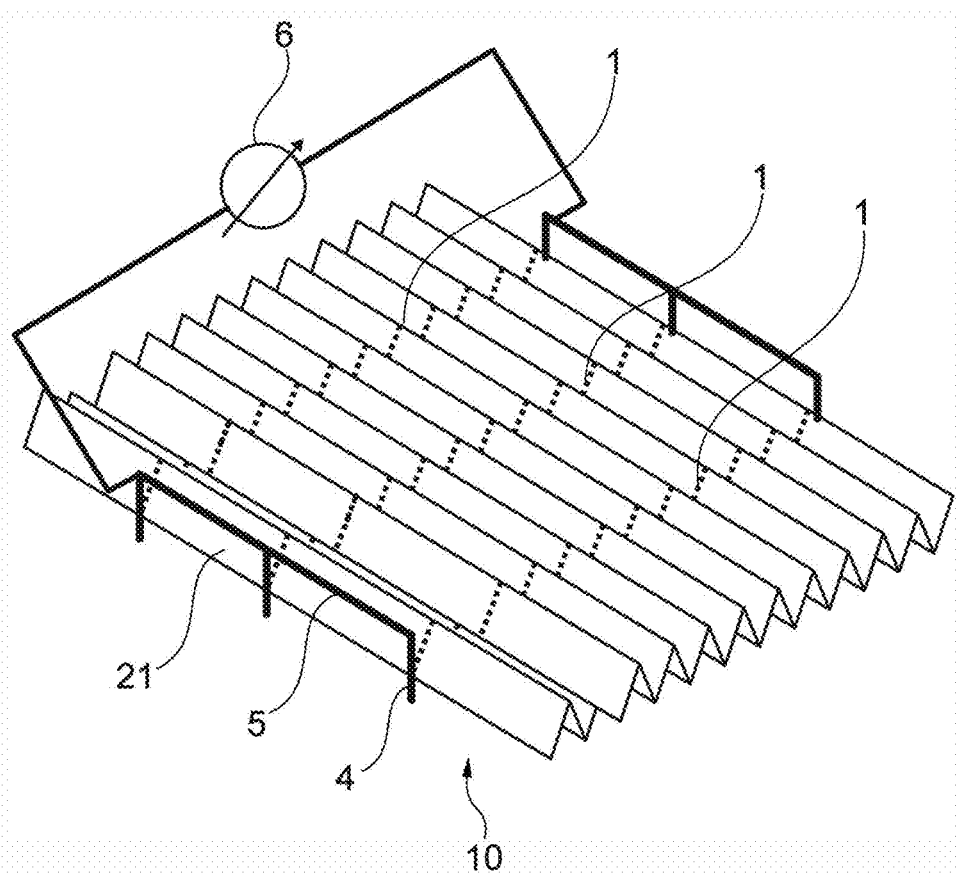
FIG. 8 is a schematic illustration of a further embodiment of the arrangement of the filter device.

In FIG. 8, in contrast to FIG. 7, the indicator devices 1 are connected in a parallel configuration to only one measuring device 6. Here, too, each indicator device 1 may have a different indicator material 2, which may be configured for detecting in each case a different substance contained in the air for filtering. The arrangement as per FIG. 8 advantageously makes it possible that, in the event of mechanical damage to one or two of the three indicator devices 1, a measurement still takes place, and the life expectancy of the filter device 20 can be ascertained at least with regard to one substance.

Figure 9:
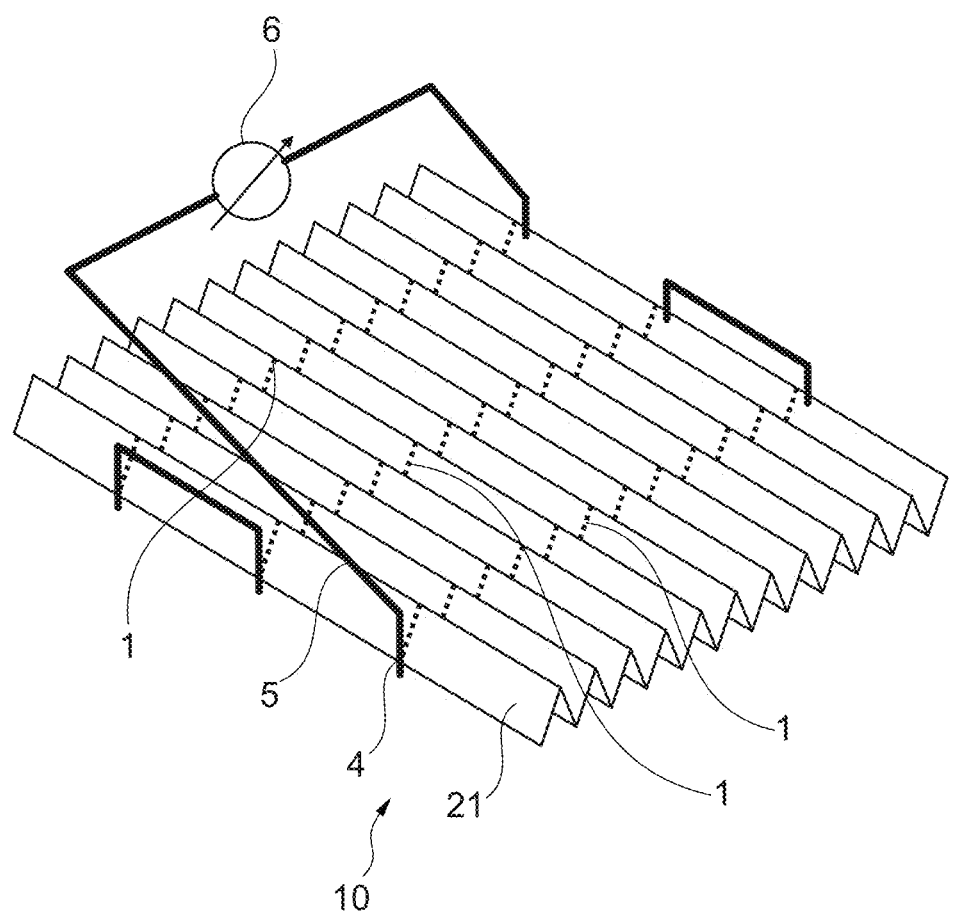
FIG. 9 is a schematic illustration of a further embodiment of the arrangement of the filter device.

In FIG. 9, in contrast to FIGS. 7 and 8, the indicator devices 1 are connected in a series configuration to only one measuring device 6. Here, too, each indicator device 1 may have a different indicator material 2, which may be configured for detecting in each case a different substance contained in the air for filtering. The arrangement as per FIG. 9 advantageously makes it possible to ascertain an averaged signal across different regions of the filter medium 21. Furthermore, it is possible here to ascertain the life expectancy of the filter device 20 with regard to a first substance that causes a significant degradation of the filter material.

Figure 10:
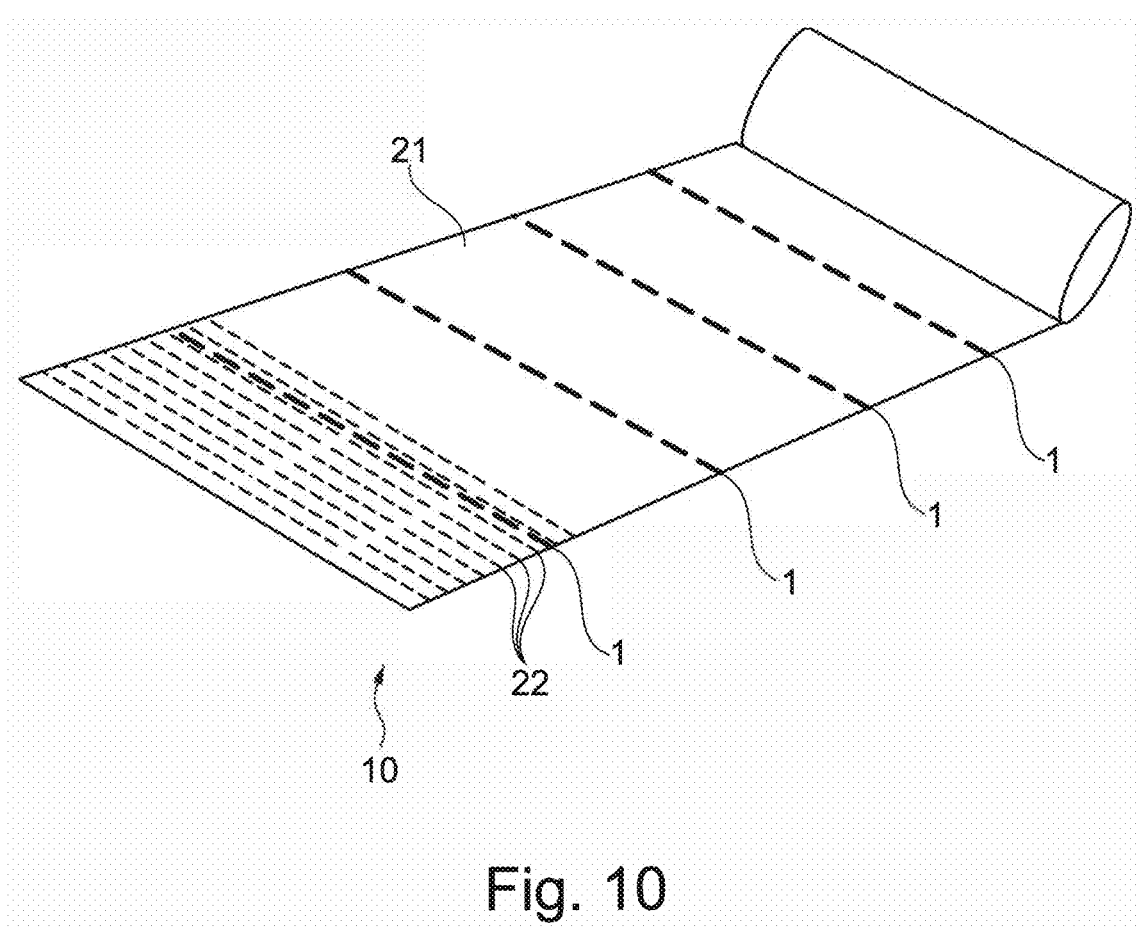
FIG. 10 is a schematic illustration of a further embodiment of the arrangement of the filter device.

FIG. 10 illustrates how the indicator device 1 can be arranged in the filter medium 21 longitudinally with the pleats, that is to say in the pleats. Here, the filter medium 21 is in its situation prior to the pleating process, with pleat lines 22 already indicated. The filter medium 21 is present in unrolled form. Four indicator devices 1 are shown, which are arranged in the region of the surface of the filter medium 21 prior to the pleating of the filter medium 21, for example by virtue of a metal wire being sewn into, or graphite lines being printed onto, the surface. In this example, material of the filter medium 21 serves directly as carrier material 3.

Figure 11:
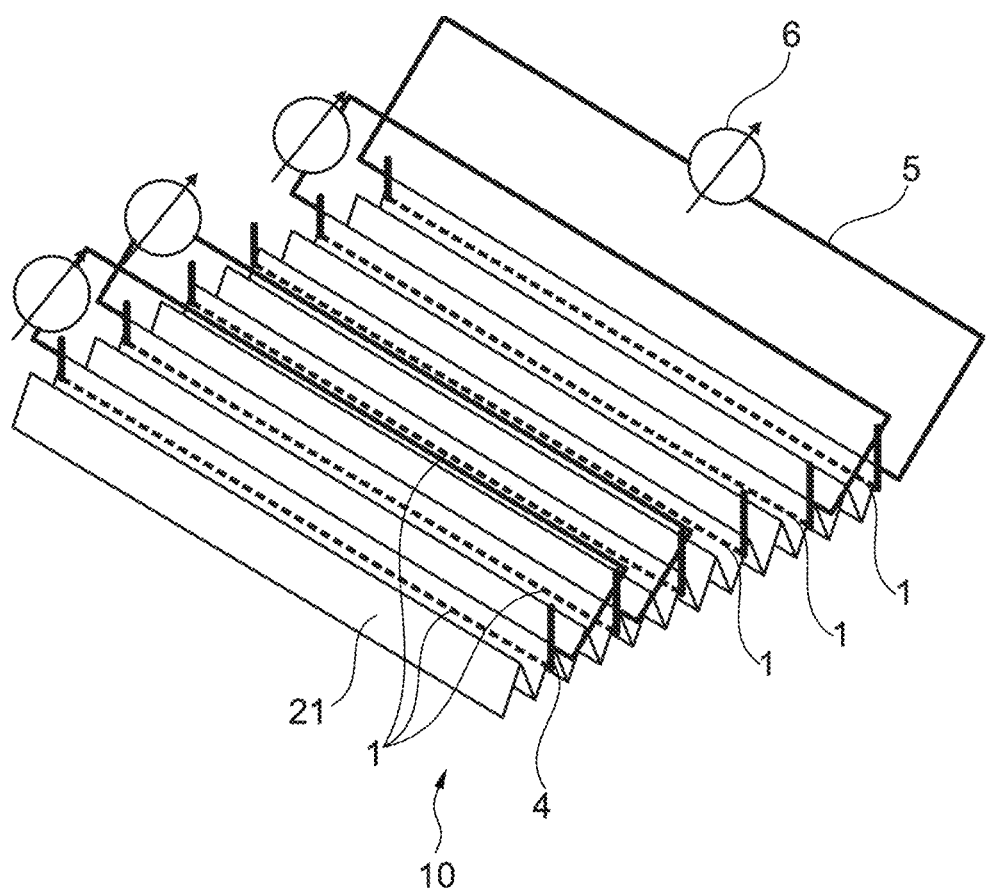
FIG. 11 is a schematic illustration of a further embodiment of the arrangement of the filter device.

FIG. 11 shows the arrangement of FIG. 10, with the filter medium 21 having been pleated. Here, analogously to the arrangement of FIG. 7, each indicator device 1 is connected to a dedicated measuring device 6 (individual configuration), which also makes it possible to obtain the characteristics and corresponding advantages discussed with regard to FIG. 7.

Figure 12:
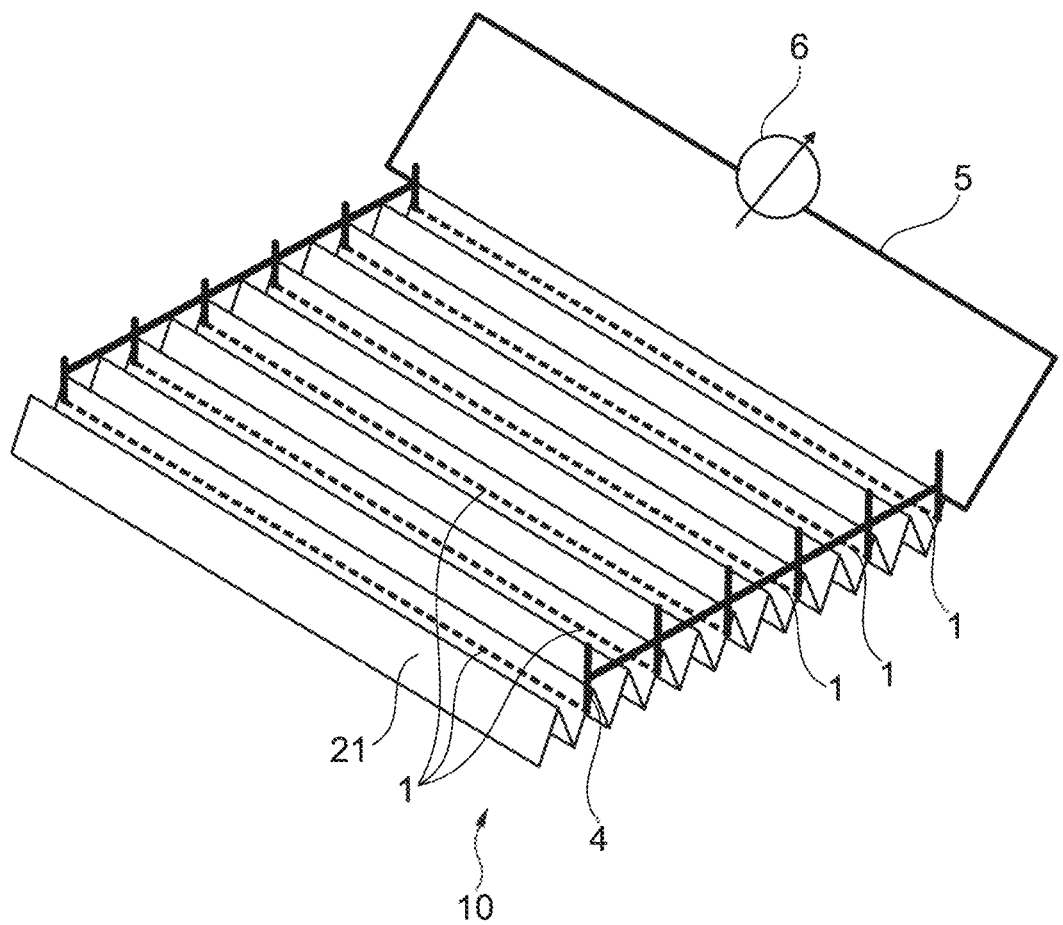
FIG. 12 is a schematic illustration of a further embodiment of the arrangement of the filter device.

In FIG. 12, in contrast to FIG. 11 and analogously to FIG. 8, the indicator devices 1 are connected in a parallel configuration to only one measuring device 6. This arrangement therefore also makes it possible to obtain the characteristics and corresponding advantages discussed with regard to FIG. 8.

Figure 13:
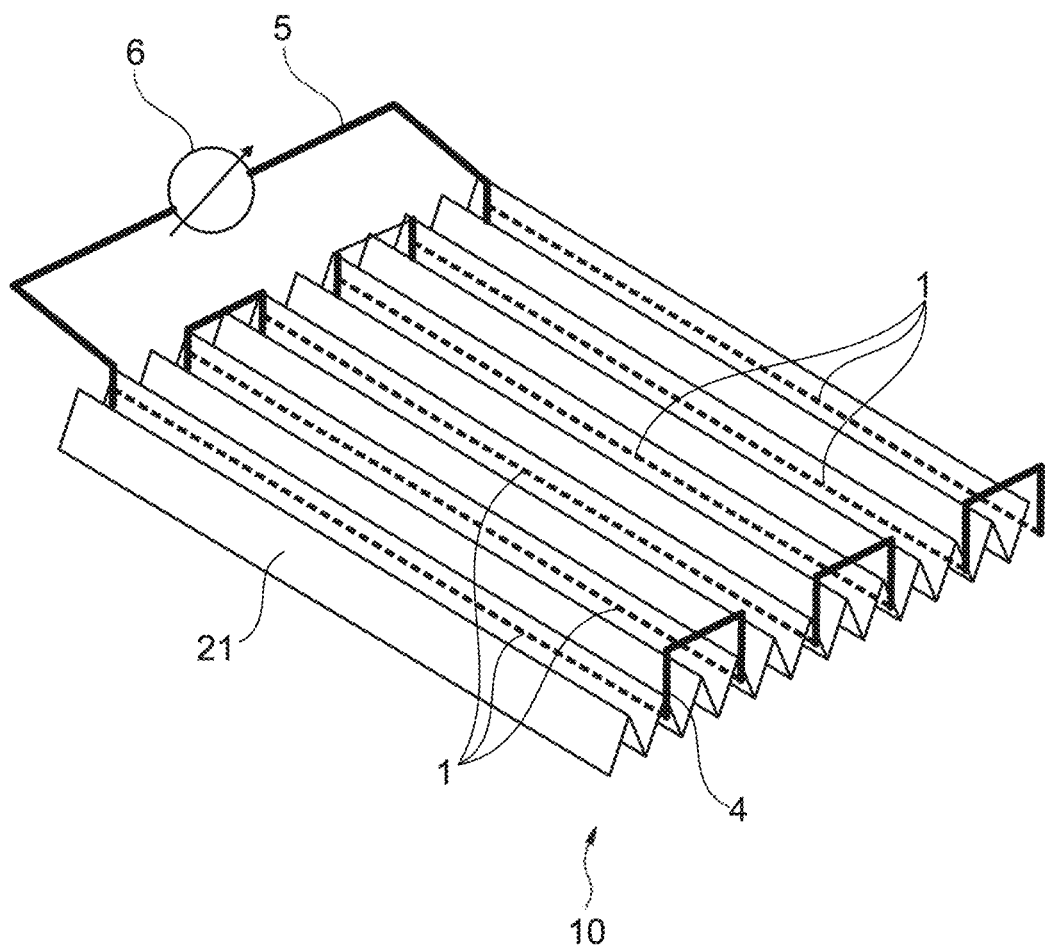
FIG. 13 is a schematic illustration of a further embodiment of the arrangement of the filter device.

In FIG. 13, in contrast to FIGS. 7 and 8 and analogously to FIG. 9, the indicator devices 1 are connected in a series configuration to only one measuring device 6. This arrangement therefore also makes it possible to obtain the characteristics and corresponding advantages discussed with regard to FIG. 8.

Figure 14:
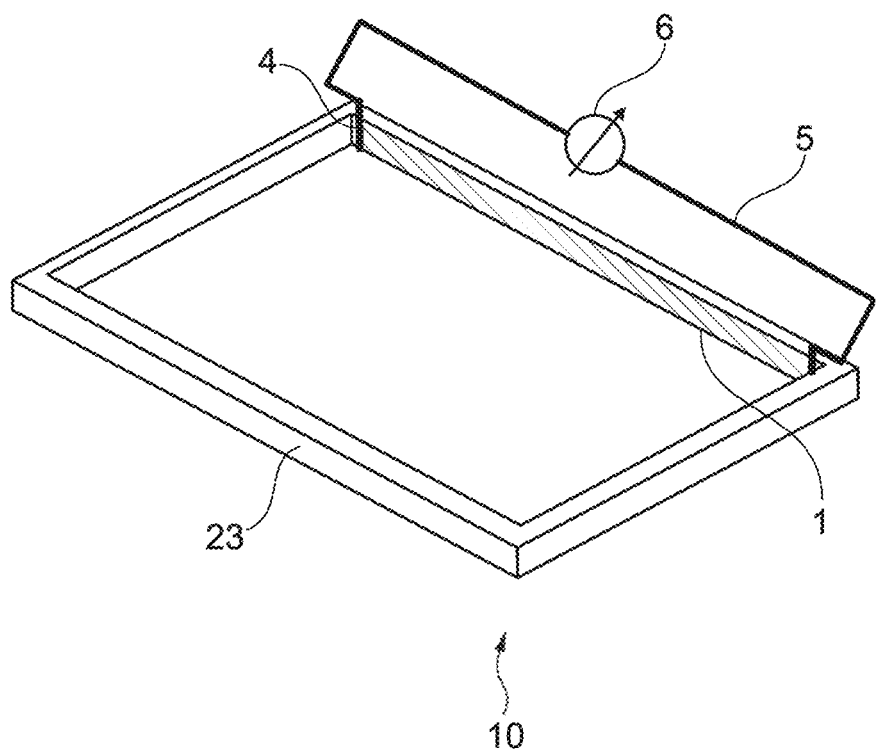
FIG. 14 is a schematic illustration of a further embodiment of the arrangement of the filter device.

FIG. 14 shows an embodiment of an indicator device 1 which is arranged in a filter frame 23 which is part of the filter device 20. The indicator device 1 is in this embodiment arranged along one of the relatively long sides of the filter frame 23. In this way, information regarding the life expectancy of the filter device 20 can be obtained without integrating the indicator device 1 in or on the material of the filter medium 21.

Figure 15:
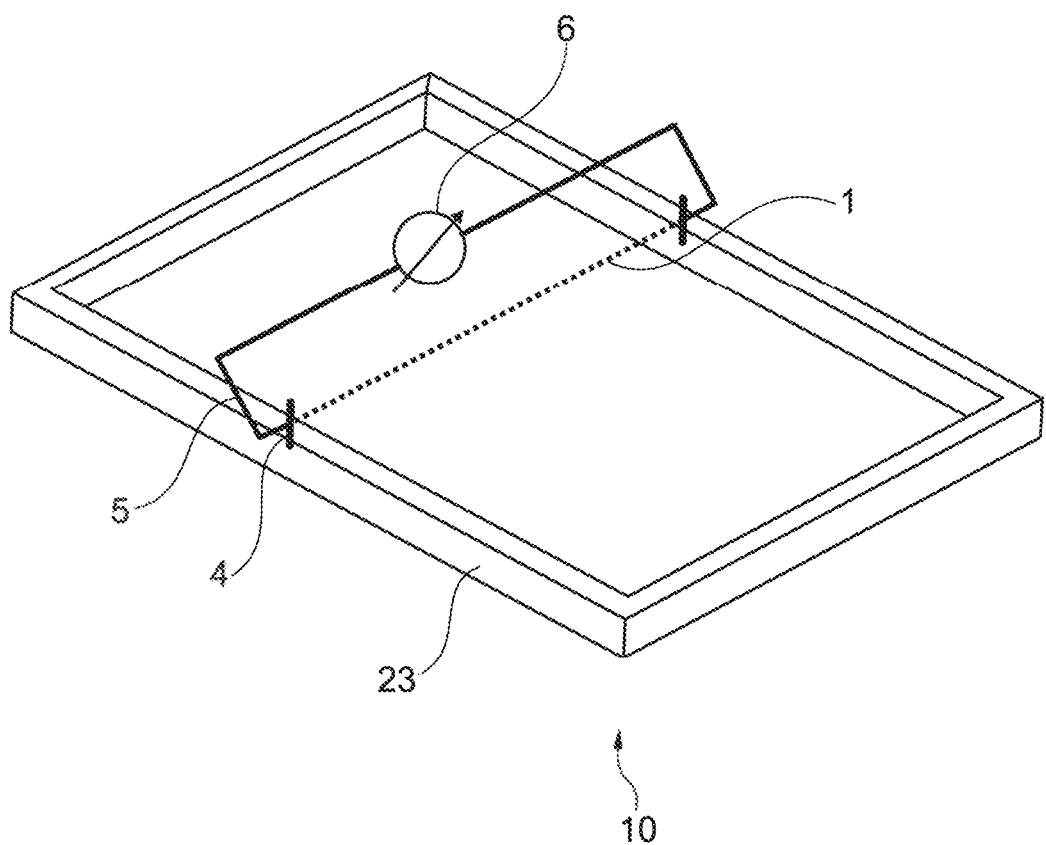
FIG. 15 is a schematic illustration of a further embodiment of the arrangement of the filter device.

FIG. 15 shows an indicator device 1 which is arranged on the filter frame 23 in the middle of the relatively long sides of the filter frame 23. Similarly, to FIG. 14, information regarding the life expectancy of the filter device 20 can in this way be obtained without integrating the indicator device 1 in or on the material of the filter medium 21.

Figure 16:
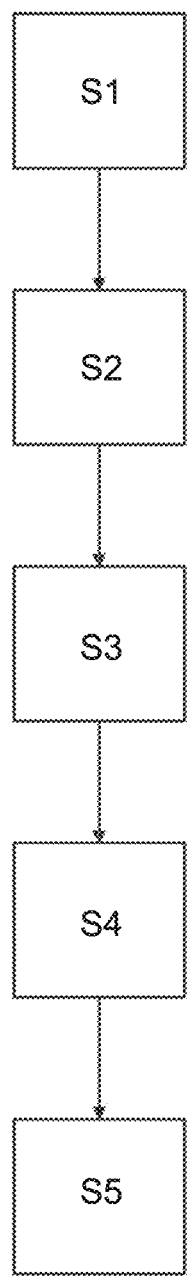
FIG. 16 is a flow diagram of an embodiment of a method for detecting a status of a loading of a filter device.

FIG. 16 illustrates a method for detecting a status of the loading of a filter device 20 in the air-conditioning system of a motor vehicle. In a first step 51, the air-conditioning system of the motor vehicle is set in operation. By use of the air-conditioning system, outside air is drawn into the vehicle interior compartment, which outside air is filtered by use of the filter device 20.

In a second step S2 of the method, the resistance of the indicator device is measured by use of the measuring device 6. The present resistance serves as a measure for the state of the indicator device.

In a third step S3 of the method, the measured resistance is compared with a reference curve. The ratio of the conductivity of the indicator device 1 to the present loading of the filter device 20 is plotted on the reference curve.

In a fourth step S4 of the method, the relative life expectancy of the filter device is evaluated. In a fifth step S5, the relative life expectancy of the filter device is displayed by use of a suitable device in the vehicle, for example in the dashboard. A control device (not shown) receives the data from the measuring device 6 and evaluates and converts the data into a signal or information in the vehicle interior compartment. A color-based code using LEDs, digital information, or other options may be used for this purpose. It may also be directly displayed that the filter device must or should be exchanged.

An arrangement of a filter device, a motor vehicle having such an arrangement, and a method for detecting a status of a loading of a filter device are provided. Further advantageous embodiments and refinements of the disclosure will emerge from the figures and from the exemplary embodiments. The embodiments of the disclosure may advantageously be combined with one another.

A first aspect of the disclosure relates to an arrangement of a filter device, configured for filtering particles out of an air stream, of an air-conditioning system of a motor vehicle, which filter device has at least one indicator device arranged in the filter device, in which filter device the indicator device has at least one electrically conductive indicator material, the conductive characteristics of which vary in a manner dependent on the degree of loading of the filter device with filtered particles.

By use of the arrangement of the filter device, it is ascertained and displayed when a filter should be exchanged owing to excessively high loading. The arrangement advantageously makes it possible, with knowledge of the degree of loading, to exchange the filter of an air-conditioning system when the function of the filter is no longer ensured. Here, the conductivity of the indicator material is constantly monitored, and is displayed by use of a suitable display device in the vehicle interior compartment. It is for example possible here for the resistance, the inductance and/or the capacitance of the indicator device to be measured and used as a measure for the changed electrical conductivity of the indicator material. Aside from ensuring comfort for vehicle occupants, enhanced vehicle operation is also ensured, because an air-conditioning system is commonly also used for keeping the windshield clear. The terms "filter device" and "filter" are used here synonymously.

The indicator device may furthermore have an electrically non-conductive carrier material on which the conductive indicator material is arranged. By use of the carrier material, the indicator device can be arranged stably in an intended desired form on or in the filter material. The material of the filter device may however also itself serve as carrier material.

The indicator device may be arranged in the region of the front side, facing toward the incident air flow, of the filter device. This arrangement advantageously makes it possible to detect the accumulated loading of the filter over the course of time.

The indicator device may likewise be arranged in the region of the rear side, facing toward the outgoing air flow, of the filter device. This arrangement advantageously likewise makes it possible to detect the accumulated loading of the filter over the course of time. This arrangement furthermore advantageously allows a detection of the filter state. A rapid change in the electrical conductivity of the indicator device indicates that the filter has degraded and should be exchanged. A slow change in the electrical conductivity of the indicator device indicates that the filter is still functional. It is possible, and likewise advantageous, for at least one indicator device to be arranged both in the region of the front side and in the region of the rear side of the filter. Here, the indicator device may be incorporated into the material of the filter in various practical ways, for example by being printed on or sewn in.

The indicator device comprises a material whose indicator device conductivity decreases with the loading of the filter device. Here, the accumulation of particles from the air leads to a change in the material characteristics. Upon the commencement of use of the filter, the material has high conductivity, which decreases proportionally with respect to the filter loading over the course of time as a result of chemical reaction. By way of example, use may be made here of a metal (highly conductive) which, over the course of time, forms an oxide or a salt (poorly conductive), carbon (highly conductive for example in the form of activated carbon or graphite, oxidizing to form carbon dioxide), or conductive polymers or ceramics, which become brittle or porous over the course of time, and the conductivity of which decreases.

It is alternatively and likewise may be preferable for the indicator device to comprise a material whose conductivity increases with the loading of the filter device. Here, too, the accumulation of particles from the air leads to a change in the material characteristics. Upon the commencement of use of the filter, the material has low conductivity (approximately zero), which changes proportionally with respect to the filter loading over the course of time as a result of chemical reaction. By way of example, use may be made here of a metal oxide (poorly conductive) which is reduced over the course of time (highly conductive).

The indicator material may be selected from the group comprising metals, metallic materials, carbon, metal oxides, electrically conductive polymers and electrically conductive ceramics.

The carrier material may be selected from natural substances including paper, wood, cotton, silk and hairs and/or polymer substances. The carrier material may have or else be directly composed of the material of the filter.

Another aspect of the disclosure relates to a motor vehicle having an arrangement of the filter device.

A further aspect of the disclosure relates to a method for detecting a status of the loading of a filter device in the air-conditioning system of a motor vehicle, which has an arrangement, having the steps of: starting the operation of the motor vehicle, measuring the resistance of the indicator device, comparing the measured resistance with a reference curve, evaluating the relative life expectancy of the filter device, and displaying the relative life expectancy of the filter device and/or displaying that the filter device must be exchanged.

The advantages of the vehicle and method correspond to the advantages of the arrangement.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An arrangement of a filter device, configured for filtering particles out of an air stream of an air-conditioning system of a motor vehicle, the filter device comprising:
a plurality of indicator devices arranged in the filter device, each of the plurality of indicator devices having at least one electrically conductive indicator material, the conductive characteristics of which vary in a manner dependent on the degree of loading of the filter device with filtered particles, wherein each indicator device has a different indicator material configured for detecting a different substance;
a measuring device for measuring a resistance of the plurality of indicator devices; and
a control device configured to compare the measured resistances with a reference curve, wherein a relative life expectancy of the filter device is evaluated and displayed in the vehicle.

2. The arrangement according to claim 1, wherein the plurality of indicator devices further comprises an electrically non-conductive carrier material on which the conductive indicator material is arranged.

3. The arrangement according to claim 2, wherein the electrically non-conductive carrier material is selected from natural substances including paper, wood, cotton, silk and hairs and/or polymer substances.

4. The arrangement according to claim 1, wherein at least one of the plurality of indicator devices is arranged in a region of a front side, facing toward an incident air flow of the filter device.

5. The arrangement according to claim 1, wherein at least one of the plurality of indicator devices is arranged in a region of a rear side, facing toward an outgoing air flow of the filter device.

6. The arrangement according to claim 1, wherein the conductivity of the plurality of indicator devices decreases with the loading of the filter device.

7. The arrangement according to claim 1, wherein the conductivity of the plurality of indicator devices increases with the loading of the filter device.

8. The arrangement according to claim 1, wherein the indicator material is selected from the group comprising metals, metallic materials, carbon, metal oxides, electrically conductive polymers, electrically conductive ceramics.

9. The arrangement according to claim 1, wherein the filter device is arranged on a motor vehicle.

10. The arrangement according to claim 1, wherein the measuring device comprises a plurality of measuring devices, wherein each of the plurality of indicator devices is connected to a dedicated measuring device.

11. A motor vehicle comprising:
an arrangement of a filter device, configured for filtering particles out of an air stream of an air-conditioning system of a motor vehicle, the filter device comprising:
plurality of indicator devices arranged in the filter device, each of the plurality of indicator devices having at least one electrically conductive indicator material, the conductive characteristics of which vary in a manner dependent on the degree of loading of the filter device with filtered particles, wherein each indicator device has a different indicator material configured for detecting a different substance;
a measuring device for measuring a resistance of the plurality of indicator devices; and
a control device configured to compare the measured resistances with a reference curve, wherein a relative life expectancy of the filter device is evaluated and displayed in the vehicle.

12. The arrangement according to claim 11, wherein the plurality of indicator devices further comprises an electrically non-conductive carrier material on which the conductive indicator material is arranged.

13. The motor vehicle according to claim 12, wherein the electrically non-conductive carrier material is selected from natural substances including paper, wood, cotton, silk and hairs and/or polymer substances.

14. The motor vehicle according to claim 11, wherein at least one of the indicator devices is arranged in a region of a front side, facing toward an incident air flow of the filter device.

15. The motor vehicle according to claim 11, wherein at least one of the indicator devices is arranged in a region of a rear side, facing toward an outgoing air flow of the filter device.

16. The motor vehicle according to claim 11, wherein the conductivity of the plurality of indicator devices decreases with the loading of the filter device.

17. The motor vehicle according to claim 11, wherein the conductivity of the plurality of indicator devices increases with the loading of the filter device.

18. The motor vehicle according to claim 11, wherein the indicator material is selected from the group comprising metals, metallic materials, carbon, metal oxides, electrically conductive polymers, electrically conductive ceramics.

19. The motor vehicle according to claim 11, wherein the measuring device comprises a plurality of measuring devices, wherein each of the plurality of indicator devices is connected to a dedicated measuring device.

* * * * *